(12) United States Patent
Gildas

(10) Patent No.: US 11,718,382 B2
(45) Date of Patent: Aug. 8, 2023

(54) AIRCRAFT DOOR WITH ADDITIONAL SAFETY LIFT

(71) Applicant: LATECOERE, Toulouse Occitaine (FR)

(72) Inventor: Martin Gildas, L'Union Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 180 days.

(21) Appl. No.: 17/284,738

(22) PCT Filed: Oct. 16, 2019

(86) PCT No.: PCT/EP2019/078047
§ 371 (c)(1),
(2) Date: Apr. 12, 2021

(87) PCT Pub. No.: WO2020/079054
PCT Pub. Date: Apr. 23, 2020

(65) Prior Publication Data
US 2021/0323655 A1   Oct. 21, 2021

(30) Foreign Application Priority Data
Oct. 17, 2018   (FR) .................................... 1859586

(51) Int. Cl.
*B64C 1/14*       (2006.01)
*E05F 7/02*       (2006.01)

(52) U.S. Cl.
CPC ............ *B64C 1/1461* (2013.01); *B64C 1/143* (2013.01); *E05F 7/02* (2013.01); *E05Y 2900/502* (2013.01); *E05Y 2900/531* (2013.01)

(58) Field of Classification Search
CPC .......... B64C 1/1461; B64C 1/143; E05F 7/02; E05Y 2900/502; E05Y 2900/531
See application file for complete search history.

(56) References Cited

U.S. PATENT DOCUMENTS

| 4,199,120 A * | 4/1980 | Bergman ................ B64C 1/143 244/129.5 |
| 4,720,065 A * | 1/1988 | Hamatani ............... B64C 1/143 244/905 |
| 5,031,863 A * | 7/1991 | Noble ................... B64C 1/1407 D12/345 |

(Continued)

FOREIGN PATENT DOCUMENTS

| EP | 0188825 | 7/1986 |
| EP | 0677438 | 10/1995 |

(Continued)

*Primary Examiner* — Rodney A Bonnette
(74) *Attorney, Agent, or Firm* — Defillo & Associates, Inc; Evelyn A. Defillo

(57) ABSTRACT

Aircraft door (1) having: an opening panel (2) provided with engagement abutments (26); a frame (3) intended to be attached to the fuselage (4) of the aircraft and including engagement counter-abutments (27); a hinge arm (5); a lifting lever (10); and a rotary control lever (20) which can be operated in a disengagement direction in order to unlock the opening panel (2). The door includes a one-way operating rod (18) which connects the control lever (20) to the lifting lever (10) and is designed to drive the lifting lever (10) only when the control lever (20) is actuated in the direction of disengagement.

10 Claims, 5 Drawing Sheets

(56) References Cited

U.S. PATENT DOCUMENTS

| | | |
|---|---|---|
| 5,255,876 A | 10/1993 | Fleming |
| 5,305,969 A | 4/1994 | Odell |
| 2015/0014483 A1 * | 1/2015 | Minchau ............... B64C 1/1423 244/129.5 |

FOREIGN PATENT DOCUMENTS

| | | | |
|---|---|---|---|
| GB | 2042060 | | 9/1980 |
| WO | WO 8401761 | * | 5/1984 |
| WO | WO2007012774 | | 2/2007 |

* cited by examiner ent entry of PCT/EP2019/
AIRCRAFT DOOR WITH ADDITIONAL SAFETY LIFT

CROSS REFERENCE TO RELATED APPLICATION

This application is a national stage entry of PCT/EP2019/078047 filed Oct. 16, 2019, under the International Convention and claiming priority over French Patent Application No. 1859586 filed Oct. 17, 2018.

TECHNICAL FIELD

The invention deals with the field of aeronautics and relates to aircraft doors.

Aircraft generally have doors comprising an opening panel designed to be opened and closed with respect to a frame fixed to the fuselage of the aircraft. These doors allow passengers or equipment to embark or disembark. These doors are therefore movable between a closed position in which the opening panel is in place in the frame and an open position in which the opening panel frees the frame to allow passage. Furthermore, these doors are necessarily provided with engagement means allowing a reliable closure of the door during the flight of the aircraft.

When the door is in open position, for example when the airplane is parked and a passenger embarkation or debarkation maneuver is in progress, the opening panel of the door is arranged outside the aircraft, facing the fuselage. While the aircraft rests on its landing gear, movements of the aircraft with respect to the ground are possible. These movements may be due for example to the effect of strong winds and are made possible by the stroke of the suspensions of the landing gear of the aircraft. These movements of the aircraft on the ground can, in the worst-case conditions, result in contact between the bottom of the opening panel of the door and a fixed element outside the aircraft, such as a staircase for passengers or a lift, or any other element placed in proximity to the door in open position.

Another risk of the same type exists when using a mobile access walkway. This type of walkway is generally tubular and is pressed onto the fuselage of the aircraft, around the door in open position, so that the passengers can go directly from the aircraft to the walkway on passing through the door. These mobile access walkways can also, for example, in the event of a false maneuver, come to abut against the bottom of the opening panel of the door in open position.

The possibility for the opening panel to come to abut against an outside element is a source of discomfort, even of malfunction.

STATE OF THE ART

The patent application U.S. Pat. No. 5,255,876 describes an aircraft door comprising a hinge arm supporting the opening panel with respect to the frame. This hinge arm is linked by one of its ends to the frame and is linked by the other of its ends to the opening panel by a sliding pivot link. The hinge arm allows the opening panel to be opened and closed with respect to the frame. The sliding pivot link between the hinge arm and the opening panel furthermore allows the opening panel a lifting motion, the aim of which is to unlock the opening panel with respect to the frame. When the door described in this document is in open position, the opening panel is in raised position by virtue of the sliding pivot link. The sliding pivot link allows a lifting motion of the door upward which is not limited by an abutment so that, if the bottom of the opening panel comes into abutment against an outside element, the opening panel will be able to be lifted by a certain additional travel. This possibility of additional lift offered by the structure of the sliding pivot described previously is useful for limiting the risk of impact or of breakage when the opening panel comes to abut against an outside element. However, a significant overhang exists between the possible point of contact of an outside element with the bottom of the opening panel and the sliding pivot link allowing the additional lift. This significant overhand induces abutting problems, stresses, and possibly immobilizations within the many mechanisms that are generally mounted on the opening panel of the door.

SUMMARY OF THE INVENTION

The invention aims to improve the aircraft doors of the prior art in preventing the consequences of the opening panel impacting with an outside element.

To this end, the invention targets an aircraft door comprising:
an opening panel provided with engagement abutments;
a frame that is intended to be fixed to the fuselage of the aircraft and comprising engagement counter-abutments;
a hinge arm supporting the opening panel with respect to the frame and guiding the opening panel between a closed position in which the opening panel is in the frame and an open position in which the opening panel is open and positioned facing the fuselage of the aircraft, freeing the opening of the frame;
a disengagement handle designed to drive in rotation a rotary control lever that can be actuated in a direction of disengagement to unlock the opening panel;
this aircraft door further comprising:
a lifting lever linking the hinge arm to the opening panel, this lifting lever being driven by the control lever when the control lever is actuated in order to unlock the opening panel, the lifting lever guiding the opening panel between a low position of engagement in which the engagement abutments of the opening panel are arranged against the engagement counter-abutments of the frame, and a high position of disengagement in which the engagement abutments of the opening panel are disengaged from the engagement counter-abutments by a lifting motion;
a one-way operating link linking the control lever to the lifting lever so that the rotation of the control lever in the direction of disengagement drives the pivoting of the lifting lever and the lifting of the opening panel with respect to the frame, from the low position of engagement to the high position of disengagement, the one-way operating link being designed to drive the lifting lever only when the control lever is actuated in the direction of disengagement.

When the opening panel of such an aircraft door comes accidentally into contact by its bottom part with an outside object, no resistance is offered to this outside element so that no impact occurs, nor any consequential damage.

The one-way operating link allows the control level to drive the lifting lever only when the control lever is actuated in order to unlock the opening panel. When the lifting lever is itself actuated in the direction of lifting of the opening panel, this lifting lever does not actuate the one-way operating link. Thus, if an upward force is exerted on the opening panel when it is in open position, for example by accidental contact with an outside object, the movement of the lifting lever which consequently takes place will not be transmitted to the control lever. A declutching occurs as soon as the lifting lever, which means that no motion other than that of the lifting lever occurs in response to a lifting of the opening panel by an outside object. An additional safety lifting function is thus created whereby the opening panel will offer an upward motion without resistance.

An additional safety lifting function is thus obtained by simple, reliable and inexpensive means. The performance of this additional safety lifting function is optimal since the mechanism is declutched as close as possible to the longitudinal axis of the opening panel, that is to say as close as possible to the axis in which accidental lifting risks occurring.

The aircraft door can comprise the following additional features, alone or in combination:

the aircraft door comprises a one-way guideway link between the one-way operating link and the lifting lever, this one-way guideway link comprising an abutment and allowing:

the one-way operating link to slide in the one-way guideway link when the lifting lever is displaced toward the control lever; and the lifting lever to be driven by the abutment when the control lever is actuated in the direction of disengagement;

the one-way operating link cooperates with a ball joint mounted on the lifting lever;

the control lever is mounted to rotate on the opening panel on an axis;

the lifting lever is mounted to pivot on the hinge arm on a first pivot at one of its ends, and is also mounted to pivot on the opening panel on a second pivot;

the one-way operating link is attached to the lifting lever outside of the portion of the lifting lever situated between the first pivot and the second pivot;

the one-way operating link is attached to the end of the lifting lever opposite the first pivot;

the end of the lifting lever opposite the first pivot is attached to a spring for compensating the weight of the opening panel;

the spring is linked to the opening panel;

the aircraft door comprises a device 41 for immobilizing the control lever when the door is in open position;

the aircraft door comprises two lifting levers, the one-way operating link being attached to one of these two lifting levers;

the one-way operating link comprises a rod provided at one of its ends a pivot linked to the control lever, and provided at the other of its ends with an abutment, a ball joint being mounted on a friction ring sliding along the rod.

DESCRIPTION OF THE FIGURES

Other features and advantages of the invention will become apparent on reading the following nonlimiting description, with reference to the attached drawings in which.

DETAILED DESCRIPTION

Figure 1:
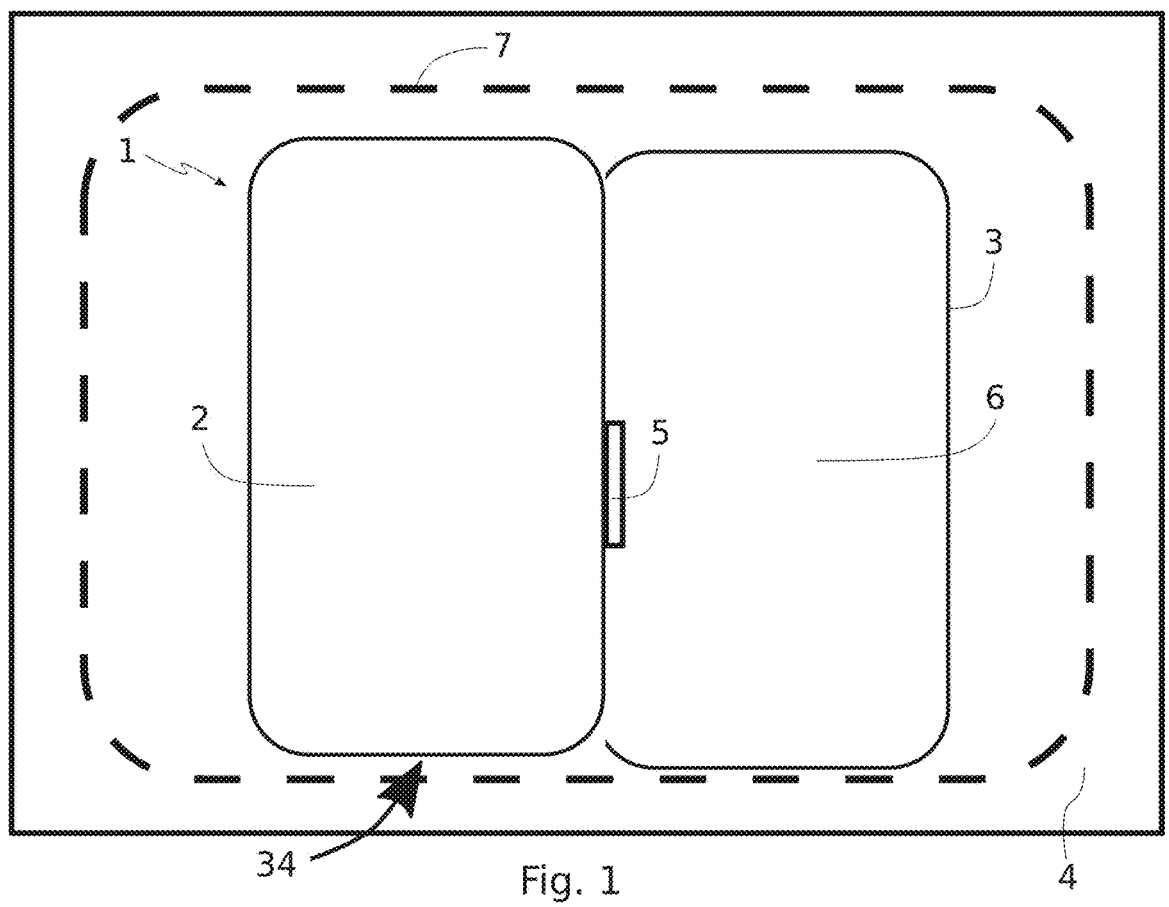
FIG. 1 is a front view of an aircraft door according to the invention in open position.

FIG. 1 is a partial schematic view of an aircraft, showing a door 1 of this aircraft in open position. The aircraft door 1 comprises an opening panel 2 and a frame 3 which is fixed to the fuselage 4 of the aircraft.

In FIG. 1, the door 1 is seen from the front from outside the aircraft. This door 1 is in open position, the opening panel 2 being positioned outside the aircraft, facing the fuselage 4 by virtue of a hinge arm 5. The free space 6 thus freed up allows the embarkation and debarkation through, in the present example, a mobile access walkway 7. This mobile access walkway 7 is schematically represented in FIG. 1 by a dashed line indicating the zone of contact between the perimeter of the mobile access walkway 7 and the fuselage 4 of the aircraft. The arrow 34 indicates an example of at-risk zone where the mobile access walkway 7 can enter into contact with the opening panel 2.

Figure 2:
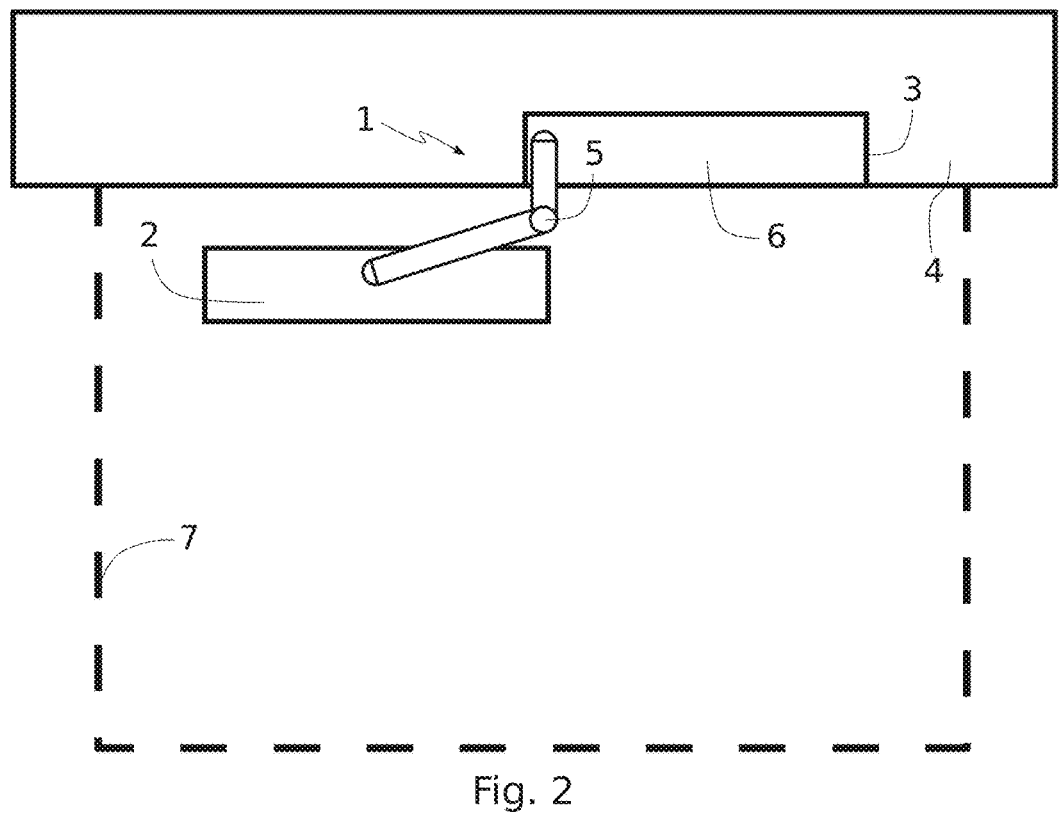
FIG. 2 is a top view of FIG. 1.
Figure 3:
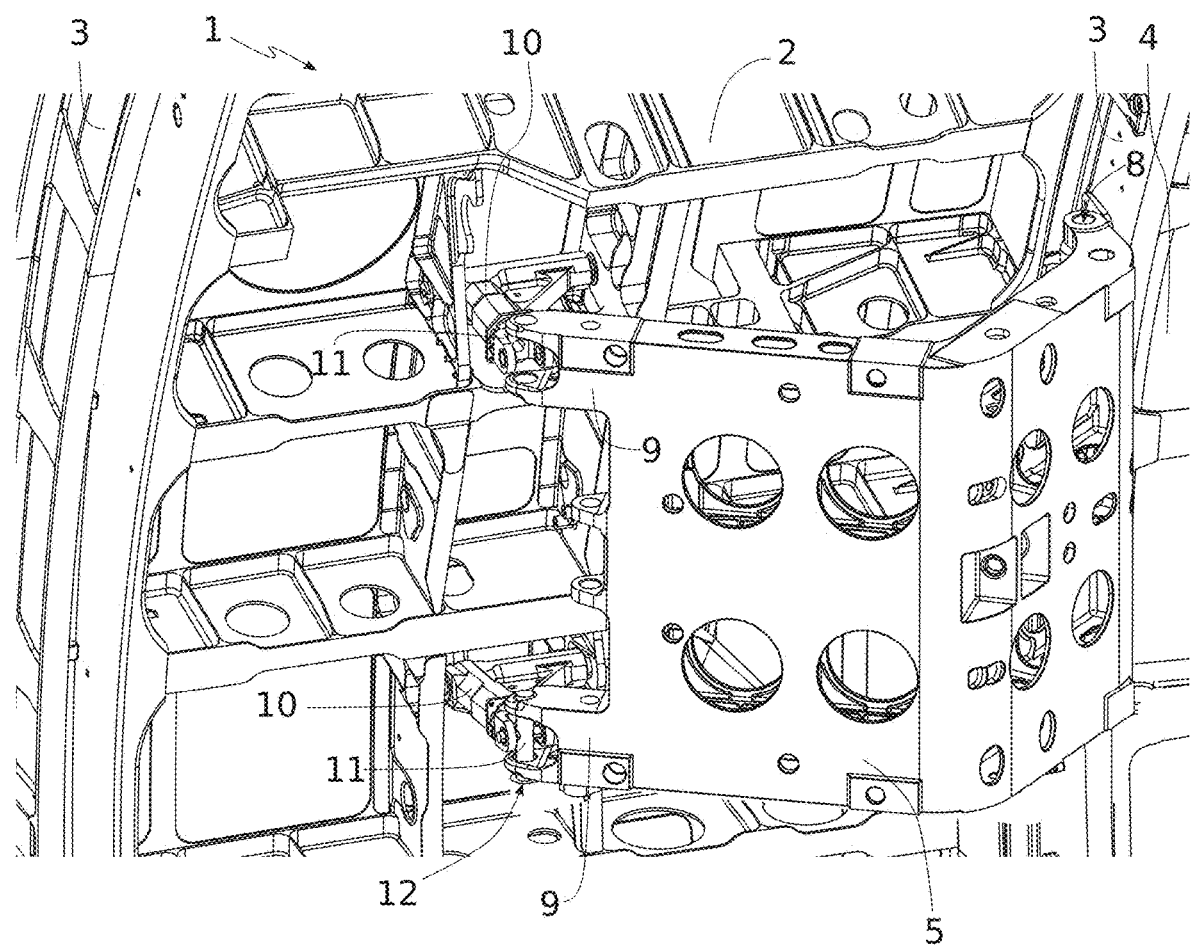
FIG. 3 represents the door of FIGS. 1 and 2 in closed position, seen from inside the aircraft.

FIG. 2 is a top view of the diagram of FIG. 1. The outline of the mobile access walkway 7 is also schematically represented by a dashed line on either side of the door 1. The hinge arm 5 is articulated by one of its ends on the frame 3 and by the other of its ends on the opening panel 2 so that the hinge arm 5 supports the opening panel 2 with respect to the frame 3 and guides the opening panel 2 between a closed position in which the opening panel 2 is in place in the frame 3 and an open position (that represented in FIGS. 1 and 2) in which the opening panel 2 is outside the aircraft, facing the fuselage 4. FIG. 3 is a partial view showing the door 1 seen from inside the aircraft and in closed position. FIG. 1 is a simplified view showing only the opening panel 2, the frame 3, the fuselage 4 and the hinge arm 5. The other mechanisms of the door 1 have not been represented here for reasons of clarity in order to show the mechanical links between the hinge arm 5 and the frame on the one hand and the opening panel 2 on the other hand.

The hinge arm 5 is linked by a pivot link 8 to the frame 3. Opposite the pivot link 8, the hinge arm 5 comprises two link lugs 9. Each link lug 9 is linked to a lifting lever 10 by an articulation 11. This articulation 11 combines a pivot link of substantially vertical axis and a pivot link of substantially horizontal axis which allow the opening panel to be maneuvered between the open and closed positions and which allow a lifting motion of the opening panel 2 with respect to the frame 3, guided by the lifting levers 10, for the engagement or the disengagement of the opening panel 2.

The lifting levers 10 are also linked to the opening panel 2 by a pivot link of substantially horizontal axis.

Figure 4:
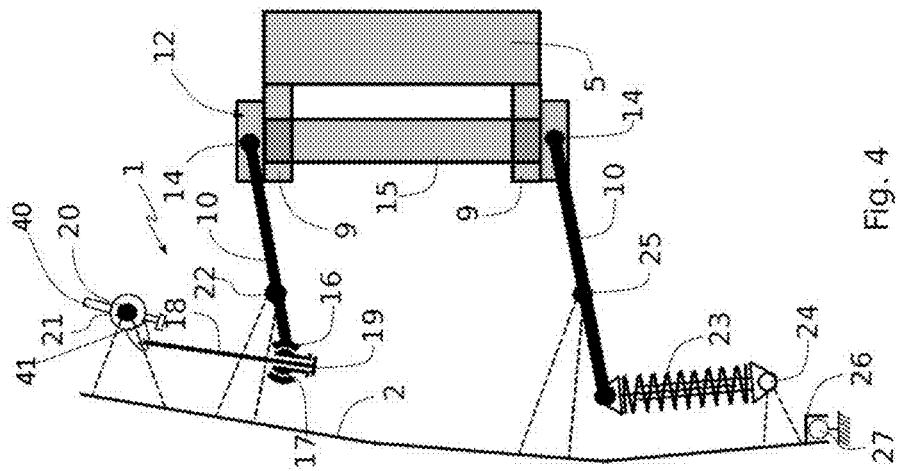
FIGS. 4 to 6 are schematic views illustrating the additional safety lifting function for a first embodiment of the invention.
Figure 5:
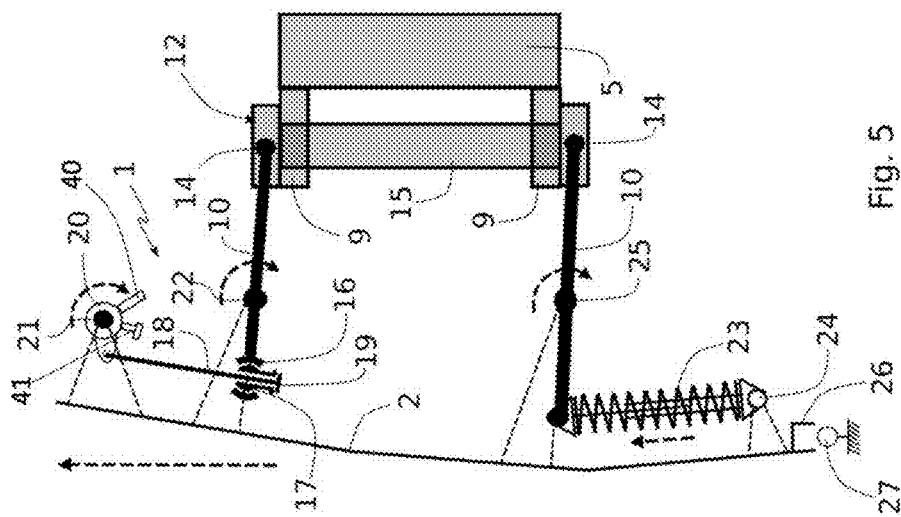
Figure 6:
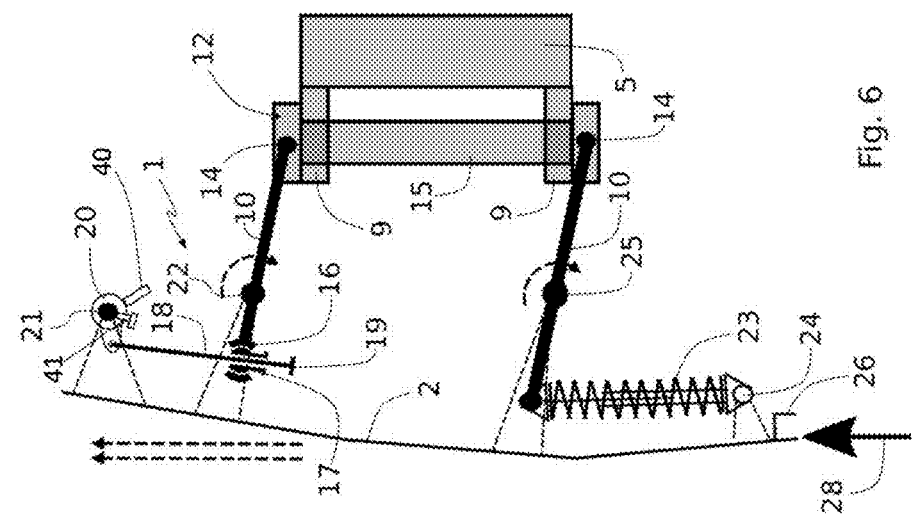

FIGS. 4 to 6 illustrate a first embodiment of the aircraft door 1. These figures are kinematic diagrams showing the mechanical links between the parts. In each of these figures, the aircraft door 1 is seen in vertical cross section. The opening panel 2 is thus represented in profile and only the end of the hinge arm 5 is visible, at the two link lugs 9. The two pivot links of vertical axis of the link lugs 9 with the lifting levers 10 are schematically represented by one and the same shaft 15 which is the axis of this pivot link 12.

The upper lifting lever 10 is mounted to pivot with respect to the hinge arm by virtue of the first pivot 14 on one of its ends. The other end of the lifting lever 10 comprises a ball joint 16 cooperating with a one-way guideway link 17. The one-way guideway link 17 is produced by a link 18 mounted to slide in the ball joint 16 and comprising, at its end, an abutment 19. This guideway link 17 is said to be one-way because, when the ball joint 16 is displaced upward (in the orientation of FIGS. 4 to 6), under the effect of a movement of the lifting lever 10, the ball joint 16 slides freely along the link 18 without transmitting its upward movement to the latter, the ball joint 16 moving away from the abutment 19. Conversely, when a relative movement of approachment occurs between the ball joint 16 and the abutment 19, the abutment can drive the ball joint 16 in its movement and the guideway is no longer functioning.

The link 18 is linked, by its end opposite the abutment 19, to a control lever 20. The control lever 20 is mounted to rotate on the opening panel 2 by a pivot 21. The rotation of the control lever 20 is controlled by a conventional mechanism (not represented), for example comprising a disengagement handle 40 that can be accessed by the user wanting to unlock the door 1, the actuation of this handle 40 driving the rotation of the control lever 20 about the pivot 21.

The upper lifting lever 10 also comprises, between its two ends, an articulation point 22 forming a pivot link between this lifting lever 10 and the opening panel 2.

The lower lifting lever 10 is, for its part, linked by one of its ends to the pivot 14 of the link lug 9 and is linked by the other of its ends to a compression spring 23 which is compressed between this end of the lifting lever 10 and a pivot link 24 on the opening panel 2. The lower lifting lever 10 also comprises, between its two ends, a pivot link 25 with the opening panel 2.

The aircraft door 1 can be locked by the cooperation of engagement abutments arranged on the rim of the opening panel and of engagement counter-abutments arranged on the internal perimeter of the frame 3. These engagement devices are schematically represented in FIGS. 1 to 6 by an engagement abutment 26 mounted on the opening panel 2 and by an engagement counter-abutment 27 mounted on the frame 3.

FIG. 4 represents the door 1 in locked position, the engagement abutment 26 being against the engagement counter-abutment 27. The door in this closed and locked position corresponds to the flight configuration of the aircraft.

In order to open the door 1, a user will actuate the handles and appropriate mechanisms to pivot the control lever 20 in accordance with the arrow of FIG. 5. The control lever 20 then drives the link 18 upward which, via its abutment 19, also drives the ball joint 16 upward. This movement of the ball joint 16 drives a pivoting of the upper lifting lever 10 about its articulation point 22, in the direction of the arrow of FIG. 5. The end of the hinge arm 5 is fixed with respect to such a movement of the upper lifting lever 10 because the hinge arm 5 is linked to the frame 3 and to the rest of the aircraft with no degree of freedom in vertical translation. The pivoting of the lifting lever 10 therefore drives the lifting of the opening panel 2 with respect to the frame 3 until the engagement abutment 26 is freed from the engagement counter-abutment 27 (position of FIG. 5). This lifting motion of the opening panel 2 is facilitated for the user by action of the spring 23 which at least partially compensates the weight of the opening panel 2 by stressing the lower lifting lever 10 for it to pivot in the direction indicated in FIG. 5 about its pivot link 25.

Once the position of disengagement of FIG. 5 is obtained, the door can be opened by virtue of the hinge arm 5 which will displace this assembly mounted on the two link lugs 9 toward the outside of the aircraft until the opening panel 2 frees the passage of the frame 3 as represented in FIGS. 1 and 2.

FIG. 6 represents the opening panel 2 in open position and undergoing a vertical thrust upward on its lower part. This thrust, schematically represented by the arrow 28 of FIG. 6, is provoked by accidental contact between an outside element and the opening panel 2. The additional safety lifting function is illustrated in this FIG. 6. The upward stressing of the opening panel 2 provokes an additional lifting of this opening panel 2, driving a pivoting of the two lifting levers 10 according to the arrows represented in FIG. 6. The pivoting of the upper lifting lever 10 drives a displacement of the ball joint 16 along the link 18. Since the sliding of the ball joint 16 on the link 18 is free for a movement in this direction, the ball joint 16 slides freely without driving other elements of the mechanism.

When the accidental stressing ceases, the opening panel 2 reverts to its position of FIG. 5 by gravity, until the ball joint 16 comes against the abutment 19. No damage is thus undergone by the mechanism during this additional safety lifting movement.

Optionally, a safety device can lock the rotation of the control lever 20 when the door is in open position to guarantee that the position of FIG. 5 is maintained.

For the door 1 to be switched to closed and locked position, the opening panel 2 is returned into position in the frame 3 and is driven downward by hand or using other devices until the engagement abutments 26 and counter-abutments 27 come against one another.

Figure 7:
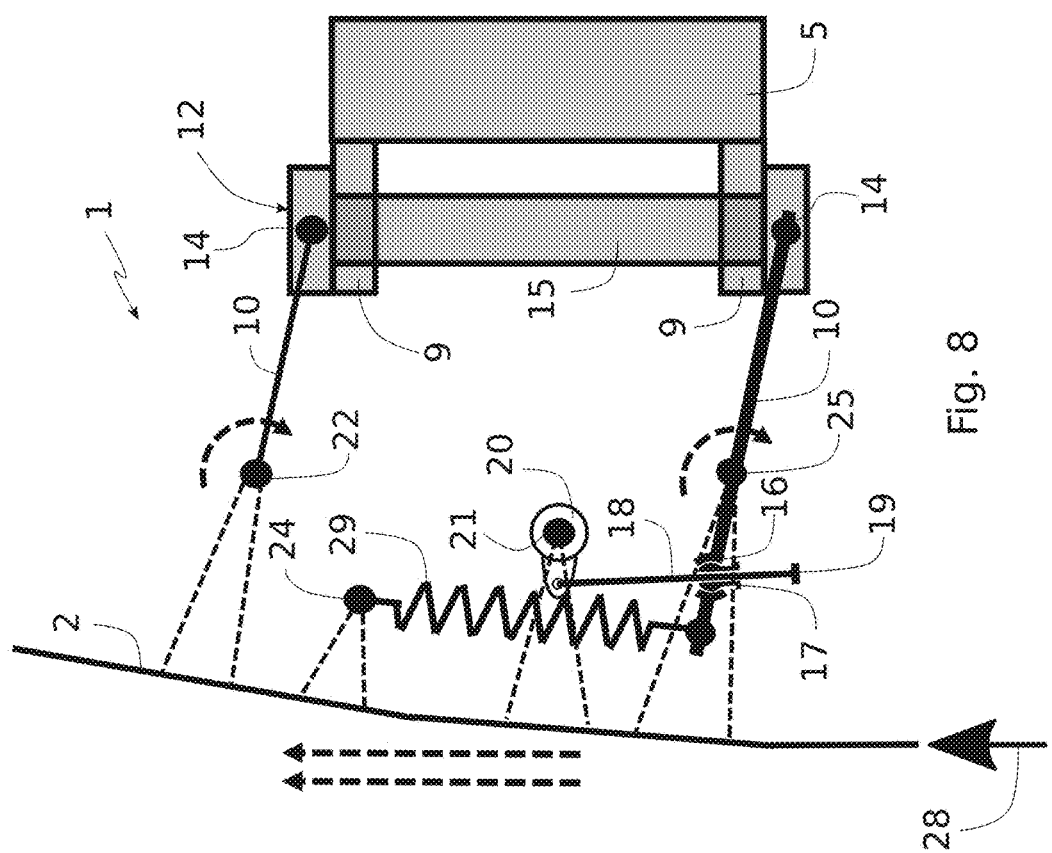
FIGS. 7 and 8 illustrate the additional safety lifting function for a second embodiment of the invention.
Figure 8:
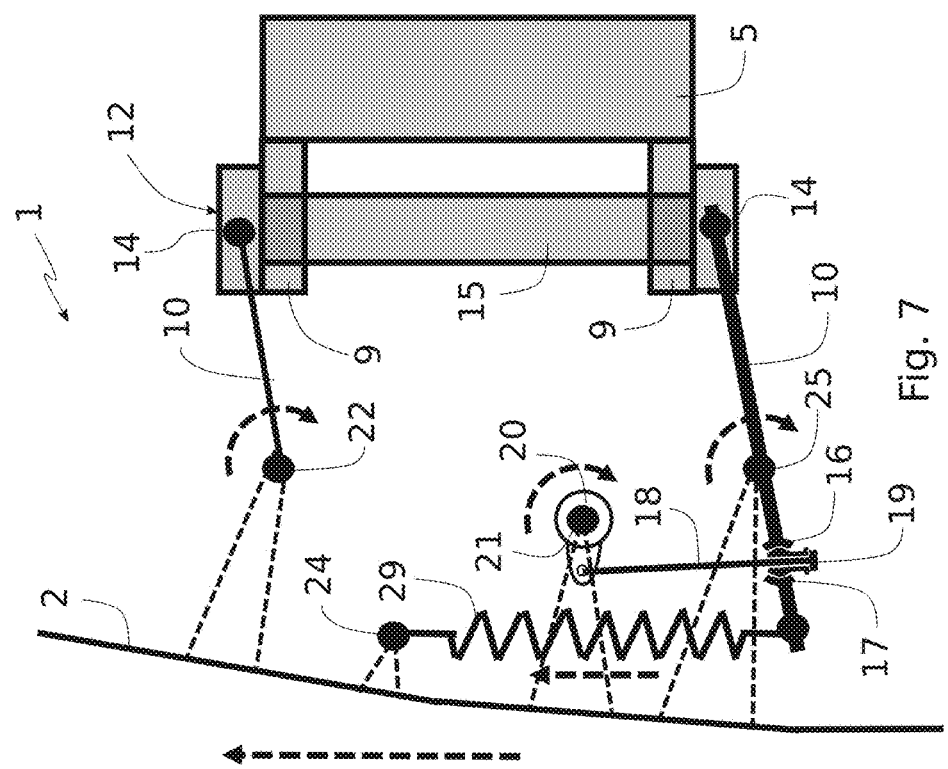

FIGS. 7 and 8 illustrate a second embodiment of the invention. These figures are schematic views similar to the views of FIGS. 4 to 6. The elements that are common to the first and second embodiments bear the same reference numbers in the figures.

According to this second embodiment, the lifting lever 10 is only linked by each of its ends, respectively, to the opening panel 2 and to the pivot 14 of the upper link lug 9. The lower lifting lever 10 is, for its part, linked by one of its ends to the pivot 14 of the lower link lug 9 and by the other of its ends to a traction spring 29. Between its two ends, this lifting lever 10 is mounted on a pivot 25. Between the pivot 25 and the end attached to the spring 29, the lower lifting lever 10 comprises a ball joint 16 associated with a one-way operating link 18, provided with an abutment 19. The link 18 is linked by its other end to a control lever 20 which is mounted on a pivot link 21 with respect to the opening panel 2.

FIG. 7 illustrates the door 1 in its unlocked and open position (corresponding to the position of FIG. 5 for the first embodiment), the engagement abutments 26 and engagement counter-abutment 27 not having been represented.

FIG. 8 illustrates the additional safety lifting position for this second embodiment. The opening panel 2 having been stressed upward, the movement of the opening panel 2 drives a pivoting of the two lifting levers 10 according to the arrows shown in FIG. 8, which drives a sliding of the ball joint 16 along the link 18, and therefore an additional lifting of the opening panel 2 without damage.

Figure 9:
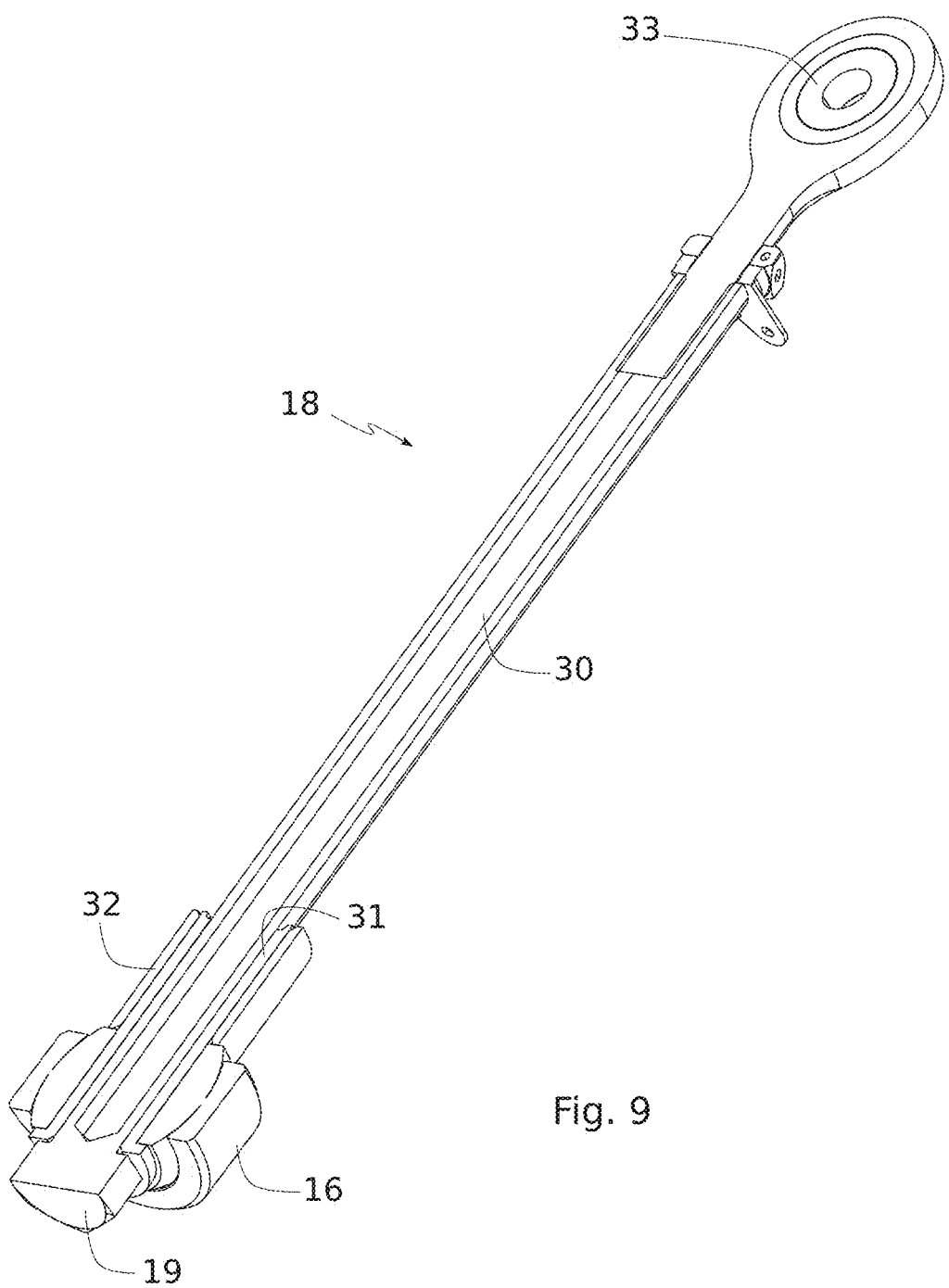
FIG. 9 represents a one-way operating link.

FIG. 9 illustrates an example of one-way operating link 18 that can be suitable for the first and second embodiments described. The link 18, seen in cross section, comprises a rod 30 provided at its end with a pivot 33 for its link with the control lever 20. At its other end, the rod 30 comprises an abutment 19. Between the abutment 19 and the pivot 33, a ball joint 16 is mounted on a friction ring 31. The friction ring 31 is produced in a material with low friction coefficient such as bronze, possibly coated with a slip coating, and is held in place by a clamped securing ring 32. The friction ring 31 forms a guideway link which is one-way by virtue of the abutment 19.

Other features of the aircraft door can be considered without departing from the scope of the invention. For example, the one-way operating link can cooperate directly with an orifice of the lifting lever 10 without requiring a ball joint 16. Moreover, the one-way operating link can drive the lifting lever 10 not by traction but by compression, that is to say that the operating link then pushes the lifting lever 10, under the effect of the rotation of the control lever, to disengage the opening panel. For that, it is sufficient for the control lever 20 to be situated under the corresponding lifting lever 10 rather than above as in the two embodiments described.

Moreover, the one-way operating link can be produced by mechanical means other than the link 18 associated with the abutment 19, notably by any means allowing the guideway link to be stopped in one direction and not in the other.

The compensating springs 23, 29 of the two embodiments are optional and can, moreover, be produced by other spring means, such as torsion bars.

The invention claimed is:

1. An aircraft door (1) comprising:
    an opening panel (2) provided with engagement abutments (26);
    a frame (3) intended to be fixed to the fuselage (4) of the aircraft and comprising engagement counter-abutments (27);
    a hinge arm (5) supporting the opening panel (2) with respect to the frame (3) and guiding the opening panel (2) between a closed position in which the opening panel (2) is in the frame (3) and an open position in which the opening panel (2) is open and positioned facing the fuselage of the aircraft, freeing the opening of the frame (3);
    a disengagement handle to drive in rotation a rotary control lever (20) that actuated in a direction of disengagement to unlock the opening panel (2);
  the aircraft door comprising:
    a lifting lever (10) linking the hinge arm (5) to the opening panel (2), the lifting lever (10) being driven by the control lever (20) when the control lever (20) is actuated in order to unlock the opening panel (2), the lifting lever (10) guiding the opening panel (2) between a low position of engagement in which the engagement abutments (26) of the opening panel (2) are arranged against the engagement counter-abutments (27) of the frame (3), and a high position of disengagement in which the engagement abutments (26) of the opening panel (2) are disengaged from the engagement counter-abutments (27) by a lifting motion;
    a one-way operating link (18) linking the control lever (20) to the lifting lever (10) so that the rotation of the control lever (20) in the direction of disengagement drives the pivoting of the lifting lever (10) and the lifting of the opening panel (2) with respect to the frame (3), from the low position of engagement to the high position of disengagement, the one-way operating link (18) being designed to drive the lifting lever (10) only when the control lever (20) is actuated in the direction of disengagement;
    wherein the lifting lever (10) is mounted to pivot on the hinge arm (5) by a first pivot (14) at one of its ends, and is also mounted to pivot on the opening panel (2) on a second pivot (22); and
    wherein the one-way operating link (18) is attached to the lifting lever (10) outside of the portion of the lifting lever (10) situated between the first pivot (14) and the second pivot (22).

2. The aircraft door as claimed in claim 1, further comprising a one-way guideway link (17) between the one-way operating link (18) and the lifting lever (10), the one-way guideway link (17) comprising an abutment (19) and allowing:
    the one-way operating link (18) to slide in the one-way guideway link (17) when the lifting lever (10) is displaced toward the control lever (20); and
    the lifting lever (10) to be driven by the abutment (19) when the control lever (20) is actuated in the direction of disengagement.

3. The aircraft door as claimed in claim 1, wherein the one-way operating link (18) cooperates with a ball joint (16) mounted on the lifting lever (10).

4. The aircraft door as claimed in claim 1, wherein the control lever (20) is mounted to rotate on the opening panel (2) on an axis (21).

5. The aircraft door as claimed in claim 1, wherein the one-way operating link (18) is attached to the end of the lifting lever (10) opposite the first pivot (14).

6. The aircraft door as claimed in claim 1, wherein the end of the lifting lever (10) opposite the first pivot (14) is attached to a spring (29) for compensating the weight of the opening panel (2).

7. The aircraft door as claimed in claim 6, wherein the spring (29) is linked to the opening panel (2).

8. The aircraft door as claimed in claim 1, further comprising two lifting levers (10), the one-way operating link (18) being attached to one of these two lifting levers (10).

9. An aircraft door (1) comprising:
    an opening panel (2) provided with engagement abutments (26);
    a frame (3) intended to be fixed to the fuselage (4) of the aircraft and comprising engagement counter-abutments (27);
    a hinge arm (5) supporting the opening panel (2) with respect to the frame (3) and guiding the opening panel (2) between a closed position in which the opening panel (2) is in the frame (3) and an open position in which the opening panel (2) is open and positioned facing the fuselage of the aircraft, freeing the opening of the frame (3);
    a disengagement handle to drive in rotation a rotary control lever (20) that actuated in a direction of disengagement to unlock the opening panel (2);
  the aircraft door comprising:
    a lifting lever (10) linking the hinge arm (5) to the opening panel (2), the lifting lever (10) being driven by the control lever (20) when the control lever (20) is actuated in order to unlock the opening panel (2), the lifting lever (10) guiding the opening panel (2) between a low position of engagement in which the engagement abutments (26) of the opening panel (2) are arranged against the engagement counter-abutments (27) of the frame (3), and a high position of disengagement in which the engagement abutments (26) of the opening panel (2) are disengaged from the engagement counter-abutments (27) by a lifting motion;
    a one-way operating link (18) linking the control lever (20) to the lifting lever (10) so that the rotation of the control lever (20) in the direction of disengagement drives the pivoting of the lifting lever (10) and the lifting of the opening panel (2) with respect to the frame (3), from the low position of engagement to the high position of disengagement, the one-way operating link

(18) being designed to drive the lifting lever (10) only when the control lever (20) is actuated in the direction of disengagement;

a device for immobilizing the control lever (20) when the door is in open position.

10. An aircraft door (1) comprising:

an opening panel (2) provided with engagement abutments (26);

a frame (3) intended to be fixed to the fuselage (4) of the aircraft and comprising engagement counter-abutments (27);

a hinge arm (5) supporting the opening panel (2) with respect to the frame (3) and guiding the opening panel (2) between a closed position in which the opening panel (2) is in the frame (3) and an open position in which the opening panel (2) is open and positioned facing the fuselage of the aircraft, freeing the opening of the frame (3);

a disengagement handle to drive in rotation a rotary control lever (20) that actuated in a direction of disengagement to unlock the opening panel (2);

the aircraft door comprising:

a lifting lever (10) linking the hinge arm (5) to the opening panel (2), the lifting lever (10) being driven by the control lever (20) when the control lever (20) is actuated in order to unlock the opening panel (2), the lifting lever (10) guiding the opening panel (2) between a low position of engagement in which the engagement abutments (26) of the opening panel (2) are arranged against the engagement counter-abutments (27) of the frame (3), and a high position of disengagement in which the engagement abutments (26) of the opening panel (2) are disengaged from the engagement counter-abutments (27) by a lifting motion;

a one-way operating link (18) linking the control lever (20) to the lifting lever (10) so that the rotation of the control lever (20) in the direction of disengagement drives the pivoting of the lifting lever (10) and the lifting of the opening panel (2) with respect to the frame (3), from the low position of engagement to the high position of disengagement, the one-way operating link (18) being designed to drive the lifting lever (10) only when the control lever (20) is actuated in the direction of disengagement; and wherein the one-way operating link (18) comprises a rod (30) provided at one of its ends a pivot (33) linked to the control lever (20), and provided at the other of its ends with an abutment (19), a ball joint (16) being mounted on a friction ring (31) sliding along the rod (30).

* * * * *